United States Patent
Christy (10) Patent No.: US 11,319,247 B2
(45) Date of Patent: May 3, 2022

(54) FINE GRIT CLASSIFIER

(71) Applicant: Richard W. Christy, Wayne, PA (US)

(72) Inventor: Richard W. Christy, Wayne, PA (US)

(73) Assignee: RDP Technologies, Inc., Conshohocken, PA (US)

( * ) Notice: Subject to any disclaimer, the term of this patent is extended or adjusted under 35 U.S.C. 154(b) by 280 days.

(21) Appl. No.: 16/659,079

(22) Filed: Oct. 21, 2019

(65) Prior Publication Data
US 2021/0114927 A1   Apr. 22, 2021

(51) Int. Cl.
*B01D 21/24*   (2006.01)
*C04B 2/04*   (2006.01)
*B01D 21/00*   (2006.01)

(52) U.S. Cl.
CPC .......... *C04B 2/045* (2013.01); *B01D 21/0042* (2013.01); *B01D 21/2444* (2013.01); *B01D 21/2461* (2013.01)

(58) Field of Classification Search
CPC ............ B01D 21/0042; B01D 21/2444; B01D 21/2461; B01D 21/2488; C04B 2/045
USPC ....................... 210/523, 523.1, 540, 800, 803
See application file for complete search history.

(56) References Cited

U.S. PATENT DOCUMENTS

| | | | | |
|---|---|---|---|---|
| 3,628,667 A | * | 12/1971 | Somora | B01D 21/2461 210/523 |
| 4,416,764 A | * | 11/1983 | Gikis | B01D 11/0223 210/803 |
| 5,368,731 A | * | 11/1994 | Pesotini | B01D 29/01 210/523 |
| 5,811,016 A | * | 9/1998 | Zierler | B01D 21/2461 210/523 |
| 9,688,547 B2 | | 6/2017 | Christy et al. | |
| 2002/0059946 A1 | * | 5/2002 | Wilcher | B01D 21/2461 134/65 |
| 2005/0035056 A1 | * | 2/2005 | Wilcher | B01D 21/0042 210/523 |
| 2005/0173354 A1 | * | 8/2005 | Binot | B01D 21/2488 210/512.1 |
| 2006/0231507 A1 | * | 10/2006 | Christy | B01D 21/2461 210/800 |
| 2008/0041774 A1 | * | 2/2008 | Park | B01D 21/2461 210/137 |

FOREIGN PATENT DOCUMENTS

DE   10250762   * 11/2003

* cited by examiner

*Primary Examiner* — Christopher Upton
(74) *Attorney, Agent, or Firm* — Paul & Paul (57) ABSTRACT

A fine grit classifier for removing grit from a milk of lime slurry includes a settling tank for receiving the milk of lime slurry, means for creating turbulence inside the tank to promote grit settling, a launder for collecting milk of lime slurry from an upper portion of the settling tank and directing milk of lime slurry to an outlet, and an auger for transporting settled grit from the lower portion of the settling tank and discharging the settled grit.

18 Claims, 7 Drawing Sheets

FINE GRIT CLASSIFIER

BACKGROUND OF THE INVENTION

1. Field of the Invention

The present invention relates to process equipment for processing milk of lime slurries.

3. Brief Summary of the Prior Art

Today most municipalities and cities provide drinking water for the population. Lime softening is a common practice to remove impurities from the drinking water and industrial process water. Generally, lime is added to the drinking water supply to precipitate out minerals such as calcium and magnesium.

The United States Environmental Protection Agency sets legal limits for over 90 contaminants in drinking water. The legal limit for a contaminant reflects the desire to protect human health. The EPA also sets testing schedules with specific testing methods that water systems must follow. The regulations are covered under the Safe Drinking Water Act which gives the states the opportunity to set and enforce their own drinking water standards if the standards are not, at minimum, as stringent as EPA's national standards. At this time there are about 151,000 public water systems in the United States.

Lime has been used to purify drinking water since the 1930's. The annual contract for supplying lime to a water plant is often based on competitive bids, and awarded to the lowest responsible bidder. Historically the lower priced lime products are less pure in terms of CaO or $Ca(OH)_2$. The impurities generally look like sand and are loosely referred to as "grit." Historically, grit has been a major nuisance at water and wastewater treatment plants. Grit is very abrasive so that it wears out mechanical equipment like pumps. It also tends to combine with other materials in the pipe and plugging of pipes is equally problematic.

When the grit/sand is in a milk of lime slurry it tends to combine with the calcium to form a mixture with characteristics of wet cement. These accumulations take place gradually and they are not noticeable to the naked eye. In time the grit auger will be overloaded and the motor will shut down. Consequently the entire process train has to be taken offline and flushed with water. At the same time the "stand-by" systems need to be placed in operation. That can take quite some time, particularly when working outside in the winter.

A common misconception is that grit is like clean, beach sand that is spherical, has a specific gravity of 2.65 and settles well in clear water. In lime application the grit is actually a collection of different minerals that are recovered during the mining, grinding and screening processing of limestone products. Desert sand is different from beach sand because of the differences in the source of that sand. The former sand is formed by the weathering of rock by the abrasive forces of wind and water. The latter is a resultant of the forces of wind and water in the ocean with the sands being sorted by weight and specific gravity.

The sand/grit found in calcium oxide supplies in the United States is actually a collection of different minerals that are recovered during the mining, crushing, screening of the various limestone products, typically having a wide range of particle sizes of 3 to 325 mesh. Above the range would be considered "coarse grit" and below the range as "ultra-fine grit." In the winter when the water is cold the settling rate is adversely affected by the colder water. Much more grit settles out in the winter further aggravating the situation.

Another issue facing the plant operators is ultimately the grit has to be transported some distance, and often to a landfill. Therefore, it is practical to remove as much water as possible prior to trucking away the grit. Therefore, the water needs to be drained from the grit prior to transportation off site.

U.S. Pat. No. 9,688,547 ("the '547 Patent"), which is incorporated herein in its entirety by reference, discloses a method and apparatus for removing or classifying grit in a milk of lime slurry.

Grit which is not removed from a milk of lime slurry can create problems in the system used to transport and apply the slurry. For example, the grit can settle out and tend to clog valves used to meter and/or apply or "dose" the slurry.

In prior art devices, it is often preferable to continuously or semi-continuously agitate the volume in the tank to prevent lime slurry from settling out. Without such agitation the lime particles will settle out of the milk of lime slurry. The problem is compounded by the fact that the milk of lime slurry is opaque, as the particles scatter light just as do the particulates in whole milk. Therefore, it is impossible to visually check the level of grit in a fine grit classifier. This has historically led to unexpected plugging issues that result from a surge and forces the system to be shut down. When that happens, the event triggers a series of time consuming tasks that need to be addressed as soon as possible. Often that can be on the third shift or over a holiday weekend.

There is a continuing need for more efficient use of lime for water treatment applications, as well as enhance the removal of grit from milk of lime slurries.

SUMMARY OF THE INVENTION

This present invention provides apparatus and methods for removing fine grit particles from a milk of lime slurry. The present invention improves the quality of the resulting purified milk of lime slurry, so that application or dosing of the milk of lime slurry can be done more accurately, with the use of relatively small pinch valves. Furthermore, grit, which is a byproduct of the classification process, can be advantageously dewatered to a relatively low moisture content product that is suitable for transport by truck or dumpster to a landfill. Removing as much water as possible prior to trucking is advantageous.

The present invention provides improved apparatus such that the grit classification process can be carried out continuously or in a batch mode, such as disclosed in the '547 Patent. Advantageously, the present invention can be used to extend the range of useful lime product inputs such that lime products of a lower grade than currently employed products can be used.

The present invention provides an improved fine grit classifier which reduces the extent to which lime will settle out in between batches when the classifier is run in batch mode.

Thus, the present invention provides a fine grit classifier for removing grit from a milk of lime slurry or suspension. The fine grit classifier of the present invention includes a settling tank for receiving the milk of lime slurry. The settling tank preferably provides a predetermined water line for the milk of lime slurry. Thus, the settling tank has a lower portion below the water line and an upper portion above the water line. The fine grit classifier also includes an inlet for delivering the milk of lime slurry to the settling tank, as well as an outlet for discharging clarified milk of lime slurry from the settling tank. The fine grit classifier also includes at least one launder for collecting milk of lime slurry from the upper portion of the settling tank and directing milk of lime slurry to the outlet. The at least one launder includes at least one weir. The fine grit classifier also includes at least one auger having a lower end and an upper end for transporting settled grit from the lower portion of the settling tank to the upper portion of the settling tank and discharging the settled grit from the fine grit classifier.

In one aspect, the fine grit classifier preferably further includes an adjustable sizing baffle to modify the surface area of the milk of lime slurry draining from the classifier, and thus limiting the size of grit particles delivered to the outlet of the settling tank. The sizing baffle is preferably provided proximate the weir of the at least one launder.

Preferably, the fine grit classifier further comprises means for inducing turbulence in the milk of lime slurry in the settling tank. In one aspect, the means for inducing turbulence includes a least one mechanical mixer. In another aspect, the means for inducing turbulence includes at least one turbulence inducer provided in the inlet for delivering the milk of lime slurry to the settling tank. In yet another aspect, the means for creating turbulence comprises means for recirculating milk of lime slurry by drawing milk of lime slurry from the lower portion of the tank and delivering the drawn milk of lime slurry to the upper portion of the tank. Preferably, the fine grit classifier further comprises at least one baffle provided in the lower portion of the settling tank for shielding the auger from induced turbulence.

In another aspect, the fine grit classifier preferably further comprises means for washing grit in the upper portion of the settling tank. Preferably, the means for washing grit in the upper portion of the settling tank includes at least one spray head for directing wash water towards the auger.

In one presently preferred embodiment, the fine grit classifier further includes a launder tank positioned generally above the settling tank, the launder tank having a greater surface area than the portion of the settling tank below the launder tank, the launder tank including the at least one launder.

In one aspect, the at least one weir preferably includes at least one single weir. In another aspect, the at least one weir preferably includes at least one double weir. In yet another aspect, the at least one weir preferably includes at least one notched weir. In a further aspect, the at least one weir preferably includes at least one weir having a first horizontal extension and at least one weir having a second horizontal extension, the second horizontal extension exceeding the first horizontal extension. Preferably, the at least one weir having a first horizontal extension is positioned between the upper end of the auger and the at least one weir having a second horizontal extension.

In another aspect, the fine grit classifier further comprises at least one vertically extending baffle positionable into the water line.

Preferably, the auger is greater than nine inches in diameter, and preferably rotated at speed from about 2 rpm to 42 rpm.

Preferably, the fine grit classifier is adapted to provide fine grit having a moisture content of from about 3 to 30 percent on a weight basis.

The present invention also provides a process for removing fine grit from a milk of lime slurry with a fine grit classifier having a plurality of fluid zones when charged with a milk of lime slurry. The plurality of zones include upper, middle and lower zones. The present method includes, preferably providing a milk of lime slurry to a fine grit classifier at a temperature from 10 to 140 degrees Fahrenheit about ambient water temperature, and creating turbulence in the middle zone while at least partially shielding the lower zone from the turbulence to encourage grit to separate from the milk of lime slurry. The process also preferably further includes permitting grit to settle to the lower zone, and transporting settled grit from the lower zone out of the milk of lime slurry to provide grit wet by the milk of lime slurry, while permitting the milk of lime slurry wetting to drain from the grit, collecting milk of lime slurry from the upper zone, the milk of lime slurry having reduced grit, and discharging grit from the classifier. The process preferably further includes providing at least one recirculation loop for recirculating milk of lime slurry. Preferably, the process includes drawing milk of lime slurry from a settling tank of the classifier, and pumping using a variable speed pump, the milk of lime slurry drawn from the classifier back into the classifier, and creating turbulence in the milk of lime slurry. Preferably, the process further includes washing the auger with water, a cleaning solution, or an acidic solution. Preferably, the process further includes providing to the settling tank water, a cleaning solution or an acidic solution, preferably from a position near the lower end of the auger, to flush or clean the compaction zone and the hindered thickening zone inside the classifier.

DETAILED DESCRIPTION

The present invention provides fine grit classifier apparatus for processing milk of lime slurries ("MOLS") for use in a batch, semi-continuous or continuous process. In contrast to past fine grit classifiers adapted to be used in batch processes, in which some of the lime would settle out with the grit that was subsequently sent to waste disposal, the present invention provides apparatus and a method to keep more of the lime in the slurry in between batches.

The present invention permits degritting of a MOLS having a lime concentration as low as 1% to 38% on a weight basis.

In one aspect, the present invention preferably provides a recirculation loop to create turbulence in the MOLS. In another aspect, the present invention preferably utilizes service water to fluidize the bed of grit that settles to the bottom of the classifier. In yet another aspect, the present invention preferably employs one or more mechanical mixers with sufficient speed to keep the lime in the slurry while allowing some of the grit particles to settle to the bottom of the classifier to be removed by the action of the classifier auger. In yet another aspect, the diameter of the grit removal auger is preferably increased in comparison with conventional augers to allow the conveyor to run more slowly to provide more time in a "beach zone" at the bottom of the classifier. The larger diameter auger also advantageously permits the throat through which grit is discharged from the classifier to be enlarged and reduces nuisance plugging issues.

In another aspect, the present invention provides a system for flushing the interior of the fine grit classifier, for example, by using a dilute acidic solution, to dissolve lime residue built up on the auger and/or the sides of the settling tank.

The present invention also provides a means and method to reduce the moisture content of the grit and thereby reduce the cost of disposal.

Preferably, an operating program is provided to increase efficiency and further reduce the frequency and duration of plugging issues that stem from segregation issues. Preferably, the operating program also monitors the amount of flushing water being used, and recalculates the batch operating parameters, so that a target final batch concentration is attained, and thus a predetermined slurry set point is maintained at the dosing assembly.

Frequently, in potable drinking water plants lime is added prior to a precipitator where the lime mixes with the water, and calcium and magnesium are precipitated out of the water supply. However, each water treatment plant may have its own unique characteristics and therefore the treatment scheme may also be unique to the water being supplied to the treatment plant. As a result, there are many different ways to add lime into a potable water treatment plant process. Typically, the MOLS is pumped to basins, many of which are exposed to the elements.

In the winter months. the source water supply is colder than in the summer months. This means the milk of lime slurry is generally colder as well. Since the settling rate is a function of water temperature, as the slurry temperature decreases, so does the ability to remove finer grit particles. As a result more fines can be carried into the process basins, and these fines subsequently end up in a sludge that settles to the bottom of the basin. Combined with the cold winter temperatures/conditions, this results in more plugging issues in winter than summer.

Preferably, in the fine grit clarification process of the present invention, MOLS is provided to the fine grit classifier at a temperature from about 10 degrees Fahrenheit to 140 degrees Fahrenheit about ambient water temperature Lime slaking systems commonly used in the water treatment industry comprises a batch tank where water and lime mix together to provide MOLS. In a subsequent process step, a holding tank is provided for the MOLS, followed by a dosing loop and fine grit removal. The dosing loop may include a combination of a pinch valve and a magnetometer for measuring low rates of MOLS being used to "dose" the water to be treated. The dosing loop may include a grit trap which promotes the successful and accurate operation of the pinch valve that regulates the flow into the treatment process. However, these pinch valves are very susceptible to being plugged by inert materials (i.e. grit) in the MOLS.

Preferably, in the process of the present invention, the flow rate can be from 40 to 400 gallons per minute ("gpm"). The surface loading is preferably from 2 to 40 gpm/sq. ft, and the weir loading rate is preferably from 2 to 42 gpm/lineal. The maximum flow rate is preferably 550 gpm. Preferably, the rotational speed of the auger is from 2 rpm to 42 rpm. Preferably, the diameter of the auger is greater than nine inches. Preferably, the fine grit delivered from the classifier has a moisture content of 3 to 30 weight percent.

As used herein, "weir" means a dam or wall over which a MOLS flows to regulate the level of the MOLS in a fine grit classifier. As use herein, "launder" means a channel or through for the conveyance of a MOLS. As used here, "baffle" means a plate that regulates the flow of a MOLS. Multiple combinations of baffles, weirs, and launders are contemplated in the fine grit classifiers of the present invention.

Preferably, in the process of the present invention, the MOLS input to the fine grit classifier is warmer than the ambient temperature. When operating the fine grit classifier in batch mode, it is preferred that the temperature of the MOLS input be in the range from 100 to 165 degrees Fahrenheit. Preferably, the MOLS input to the fine grit classifier is drawn from a source maintain a temperature of from 110 to 120 degrees Fahrenheit. In general, it is preferred that the MOLS input to the fine grit classifier have a temperature in the range of about 63 to about 200 degrees Fahrenheit.

Figure 1:
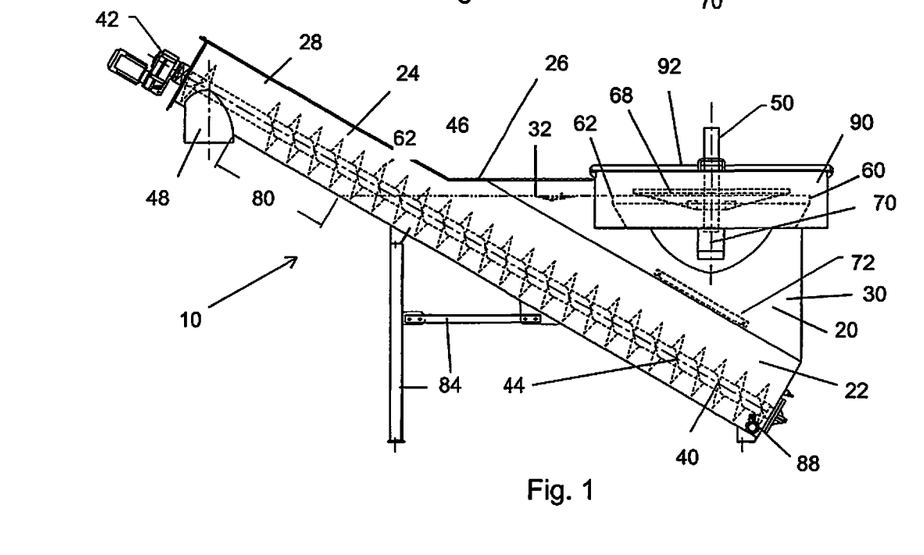
FIG. 1 is a side elevational view of a first embodiment of a fine grit classifier according to the present invention.
Figure 2:
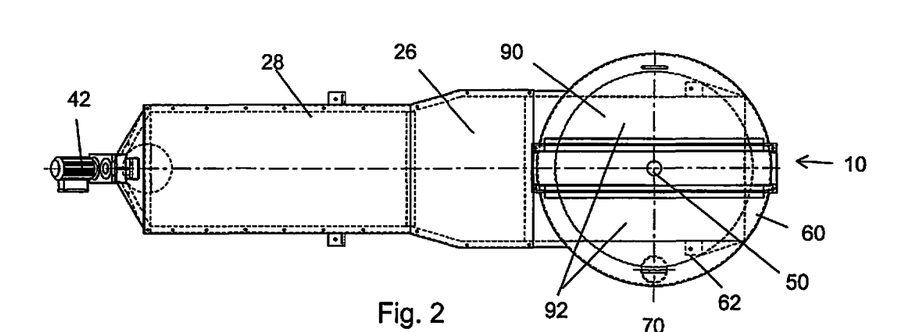
FIG. 2 is a top plan view of the fine grit classifier of FIG. 1.
Figure 3:
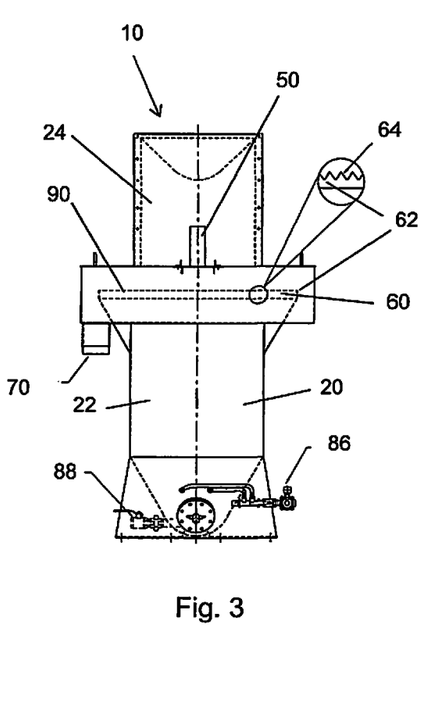
FIG. 3 is a front elevational view of the fine grit classifier of FIG. 1.

Referring now to the figures in which like reference numerals represent like elements in each of the several views, there is shown in FIG. 1 a side elevational view of a first embodiment of a fine grit classifier 10 according to the present invention. The fine grit classifier 10 includes a settling tank 20 for processing MOLS 30. The settling tank 20 has a lower portion 22 and an upper portion 24 defined by the water level or line 32 of the MOLS 30 being processed by the fine grit classifier 10. MOLS 30 is supplied to the fine grit classifier 10 through an inlet 50 adapted to discharge beneath the water line 32 to the MOLS 30 in the settling tank 20. An anti-turbulence baffle 72 is preferably provided under the discharge of the MOLS inlet 50. A sloped auger 40 having a lower portion 44 beneath the water line 32 is provided to carry grit settling out of the MOLS in the settling tank 20 from the lower portion 22 of the settling tank 20 up out of the lower portion 22 of the settling tank 20 and into the upper portion 24 of the settling tank 20. The auger 40 is driven at the upper end thereof by a suitable auger drive mechanism 42, and preferably slopes upward at an angle from about 15 degrees to 35 degrees from the horizontal. While passing along the upper portion 46 of the auger 40, liquid can drain from the grit as the grit is being transported though a drying zone 80 and subsequently discharged from the fine grit classifier 10 through a grit discharge outlet 48. Preferably, the residence time of grit being transported on the auger 40 is optimized to permit as much MOLS as possible to drain from the upper portion 46 of the auger 40. In one presently preferred embodiment, the diameter of the auger 40 is greater than nine inches, and the rotational speed of the auger 40 is less than 45 rpm, such that the residence time of the grit being transported by the auger 40 is at least 1.0 min. Clarified MOLS is discharged from the fine grit classifier 10 after passing over the weir 62 of a launder 60 inside a single-sided launder tank 90. The launder tank 90 is provided generally above the lower portion 22 of the settling tank 20 and the lower end 44 of the auger 40, and coaxial with the MOLS inlet 50. The weir 62 of the single-sided launder 60 is preferably notched as shown by the notches 64 in the inset in the front elevation view of FIG. 3. The surface area of the launder 60 is preferably controlled by the vertical positioning of a sizing baffle 68 having a generally conical lower surface. As the sizing baffle 68 is lowered into the MOLS in the launder 60 the surface area of the MOLS in the launder 60 decreases. As best seen in the top plan view of FIG. 2, the launder tank 90 has a generally cylindrical conformation, such that the surface area of the launder 60 exceeds the projection of the launder tank 90 on the underlying lower portion 22 of the settling tank 20. The launder tank 90 preferably includes covers 92 rotatable to provide access to the interior of the launder tank 90. The setting tank 20 is supported by suitable supports 84, and is provided proximate the lowest portion of the settling tank 20 with a drain 88 as well as a cleaning system 86 for flushing clean water or a cleaning solution such as a dilute acidic solution through the fine grit classifier 10 to remove built up lime residue and/or grit from the interior of the fine grit classifier 10, and especially those portions of the auger 40 and settling tank 20 where grit tends to settle.

The settling rate of the grit in the lower portion 22 of the settling tank 20 is a function of the rising rate of the water that eventually flows over the weir 62. The upward velocity of the water current carries some fine particles over the weir 62. The rate of flow is a function of the surface area of the launder 60. Lowering the sizing baffle 68 reduces the surface area of the MOLS in the launder 60, and therefore increases the rise rate velocity, as flow rate through the fine grit classifier 10 is preferably constant. Thus, the size of the fine particles removed by the auger 40 can be controlled as preferred.

Figure 4:
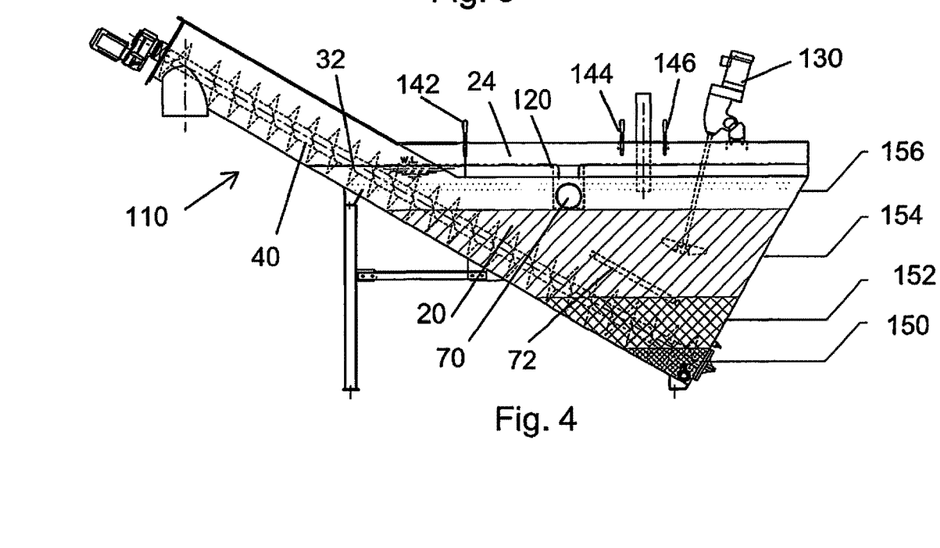
FIG. 4 is a side elevational view of a second embodiment of a fine grit classifier according to the present invention.
Figure 5:
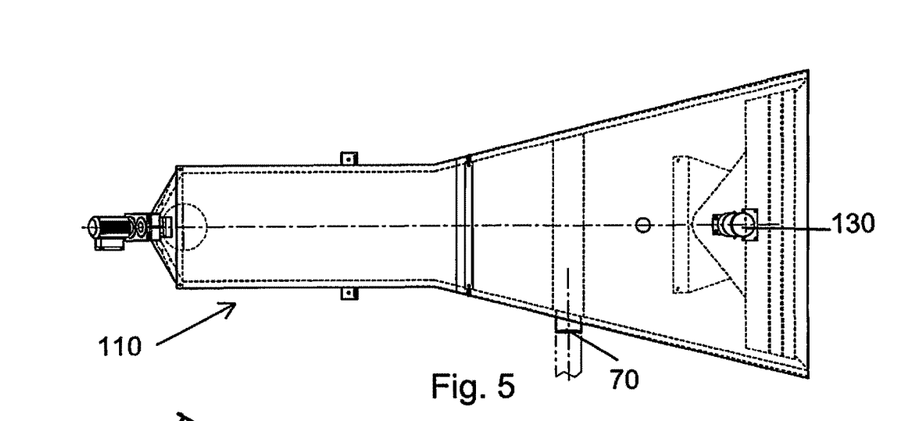
FIG. 5 is a top plan view of the fine grit classifier of FIG. 4.
Figure 6:
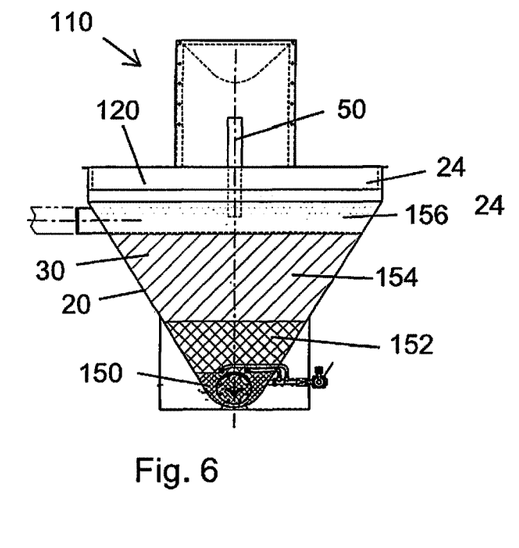
FIG. 6 is a front elevational view of the fine grit classifier of FIG. 5.

FIG. 4 is a side elevational view of a second embodiment of a fine grit classifier 110 according to the present invention. In this embodiment, a separate launder tank is omitted, and instead, the upper portion 24 of the settling tank 20 (best seen in the top plan view of FIG. 5) includes a double weir launder 120. The flow of the MOLS 30 in the settling tank 20 is adjusted using removeable baffles 140, 142, 144. The MOLS 30 is agitated using a mechanical stirring device 130. The MOLS 30 inside the settling tank can be roughly divided into a plurality of zones 150, 152, 154, 156 characterized by the contents of each zone. In the lowest zone 150 settled grit is compacted and is engaged by the auger 40. The next zone up is characterizable as a thickening zone 152 in which the concentration of suspended grit increases. Above this thickening zone 152 lies a hindered settling zone 154 in which settling of grit is retarded. Preferably, means of promoting turbulence in this zone 154 are provided in the fine grit classifier of the present invention, such as, for example, one or more mechanical stirring devices 130, of turbulence-inducing discharge from the MOLS inlet 50 to the settling tank 20, such as by the positioning of the inlet's discharge opening below the surface of the MOLS in the settling tank 20, a reduction of the diameter of the inlet's discharge opening (not shown), provision of turbulence-inducing devices in the inlet (not shown), etc. Preferably, the lower two zones 150, 152 are shielded from the induced turbulence such as by a suitable anti-turbulence baffle 72. The upper zone of the MOLS 30 is the clarified zone 156 which includes the least grit.

Figure 7:
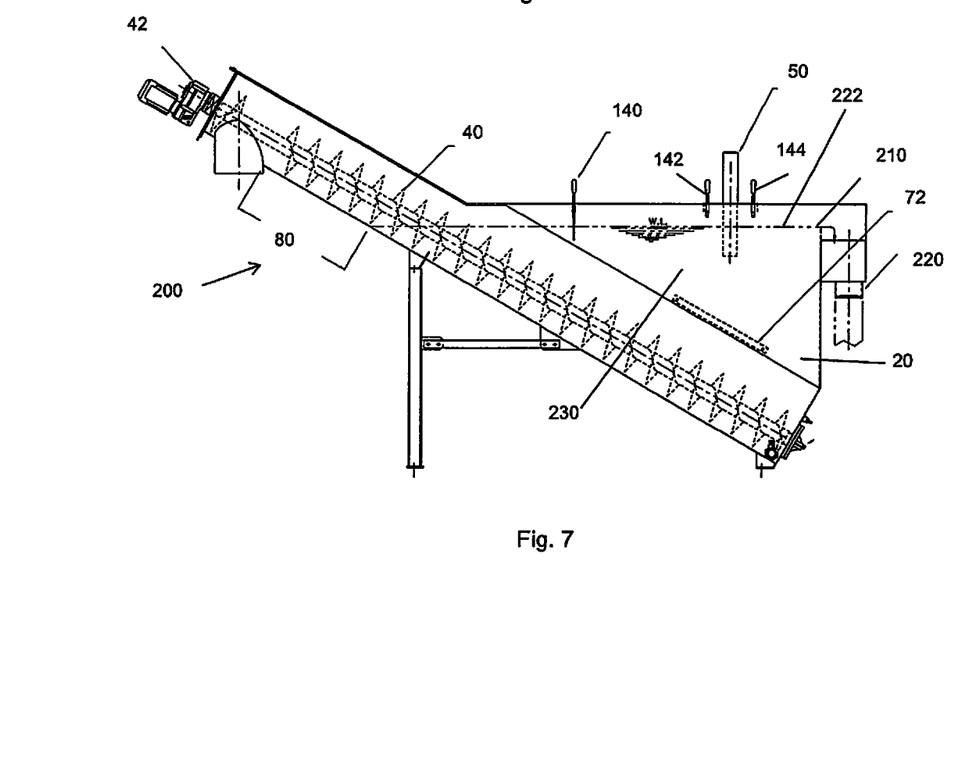
FIG. 7 is a side elevational view of a third embodiment of a fine grit classifier according to the present invention.
Figure 8:
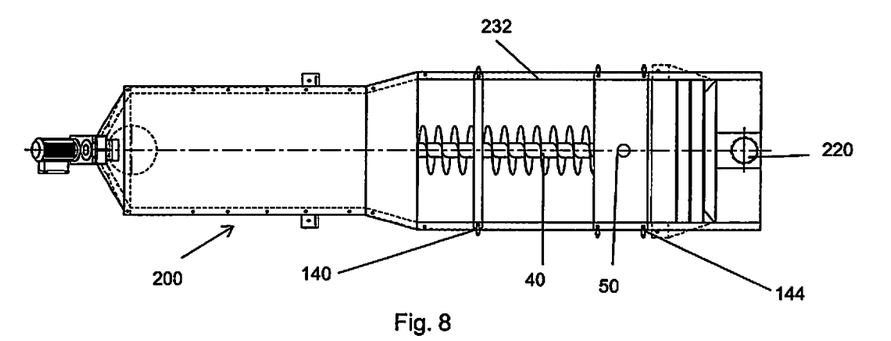
FIG. 8 is a top plan view of the fine grit classifier of FIG. 7.
Figure 9:
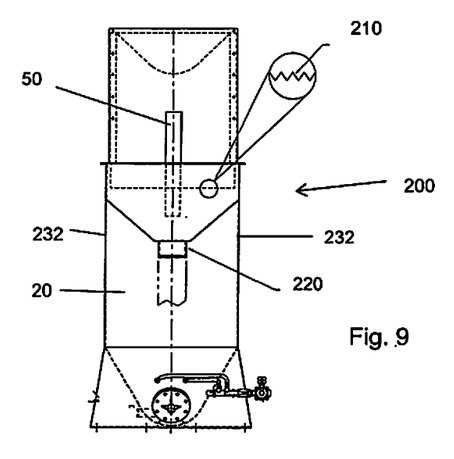
FIG. 9 is a front elevational view of the fine grit classifier of FIG. 7.

FIG. 7 is a side elevational view of a third embodiment 200 of a fine grit classifier according to the present invention. In this embodiment, the fine grit classifier 200 is provided with a single sided, notched launder 210 with a single side (as shown by the inset in the front elevational view of FIG. 9) proximate the front of the setting tank 20 to discharge clarified MOLS to an outlet 220 at the front of the classifier 200. Flow out of the classifier, as shown by the broken line 222 is adjustable with a plurality of baffles 140, 142, 144. As can be seen in the top plan view of FIG. 8, the sides 232 of the settling tank 20 are generally parallel to one another, providing a generally rectangular surface to the MOLS 30 in the classifier 200.

Figure 10:
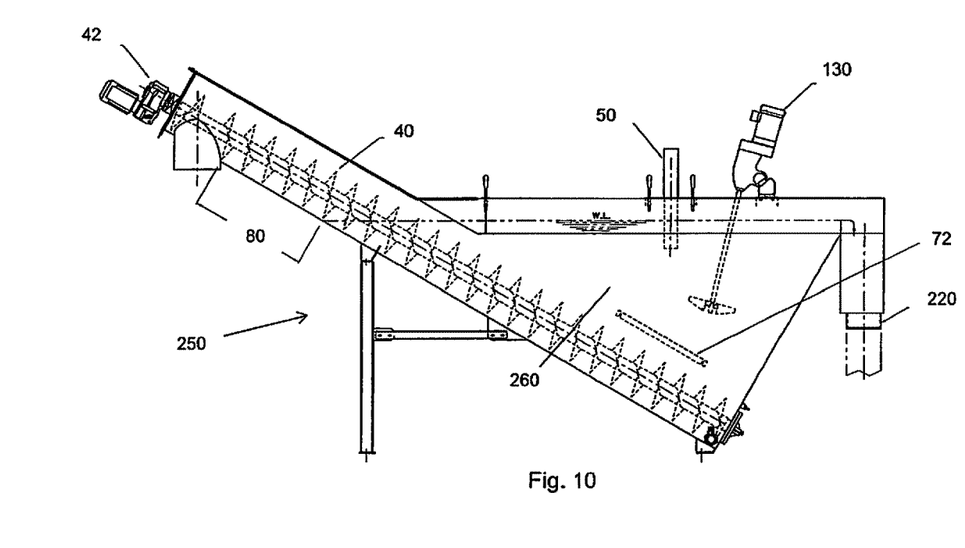
FIG. 10 is a side elevational view of a fourth embodiment of a fine grit classifier according to the present invention.
Figure 11:
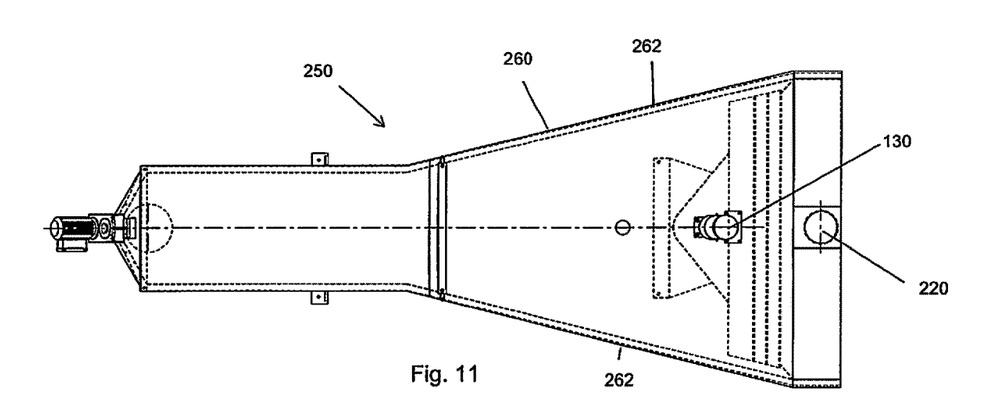
FIG. 11 is a top plan view of the fine grit classifier of FIG. 10.
Figure 12:
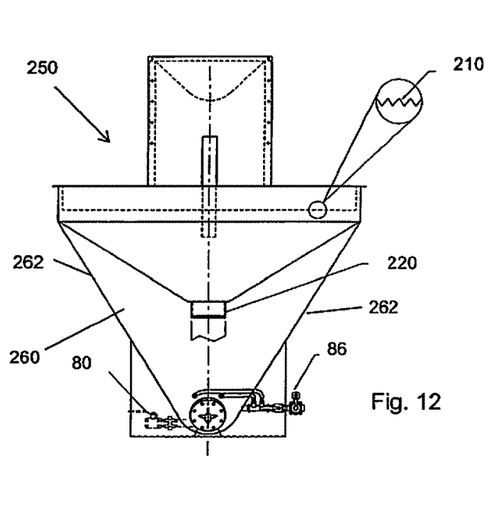
FIG. 12 is a front elevational view of the fine grit classifier of FIG. 11.

FIG. 10 is a side elevational view of a fourth embodiment of a fine grit classifier 250 according to the present invention. In this embodiment, the sides 262 of the settling tank 260 are not parallel, as best seen in the top plan view of FIG. 11, such that the surface of the MOLS 30 in the classifier has a generally trapezoidal appearance, which increases the length of the single sided weir in the launder 210 at the front of the classifier 250. A mechanical stirring device 130 is provided to increase turbulence to promote settling out of the grit in the MOLS 30.

Figure 13:
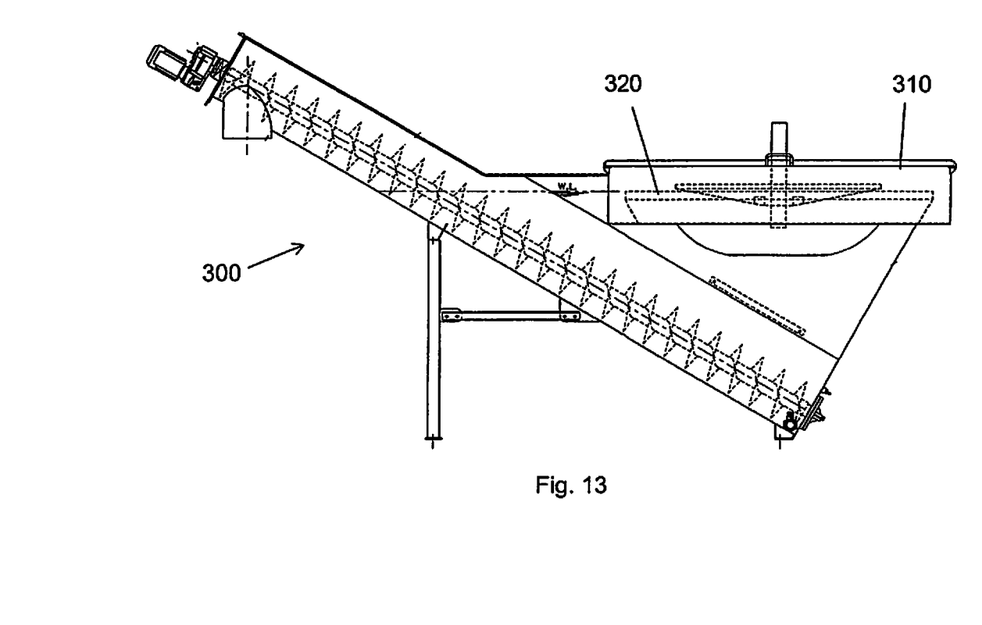
FIG. 13 is a side elevational view of a fifth embodiment of a fine grit classifier according to the present invention.
Figure 14:
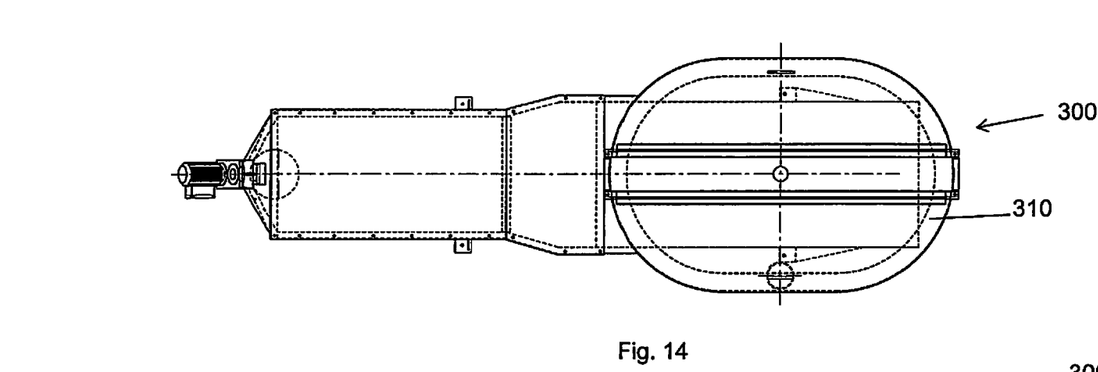
FIG. 14 is a top plan view of the fine grit classifier of FIG. 13.
Figure 15:
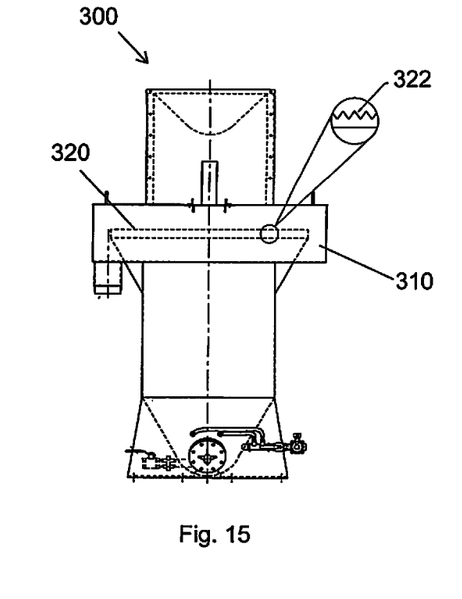
FIG. 15 is a front elevational view of the fine grit classifier of FIG. 13.

FIG. 13 is a side elevational view of a fifth embodiment of a fine grit classifier 300 according to the present invention. In this embodiment, the cylindrical launder tank 90 of the first embodiment has been replaced with a launder tank 310 having a generally oval-like surface as best seen in the top plan view of FIG. 14, so that the length of the weir 322 of the launder 320 is substantially greater.

Figure 16:
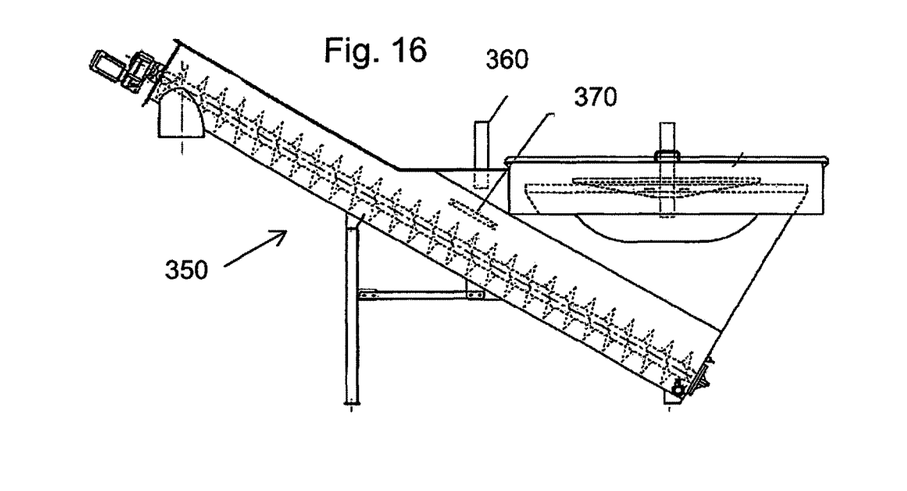
FIG. 16 is a side elevational view of a sixth embodiment of a fine grit classifier according to the present invention.

FIG. 16 is a side elevational view of a sixth embodiment of a fine grit classifier 350 according to the present invention. In this embodiment, a second inlet 360 for MOLS has been added to the fifth embodiment 300, and a turbulence dispersing baffle 370 has been added below the second inlet 360. The MOLS provided by the second inlet 360 may be provided from a holding tank (not shown) or may be MOLS recycled from the settling tank 20, or some combination thereof.

Figure 17:
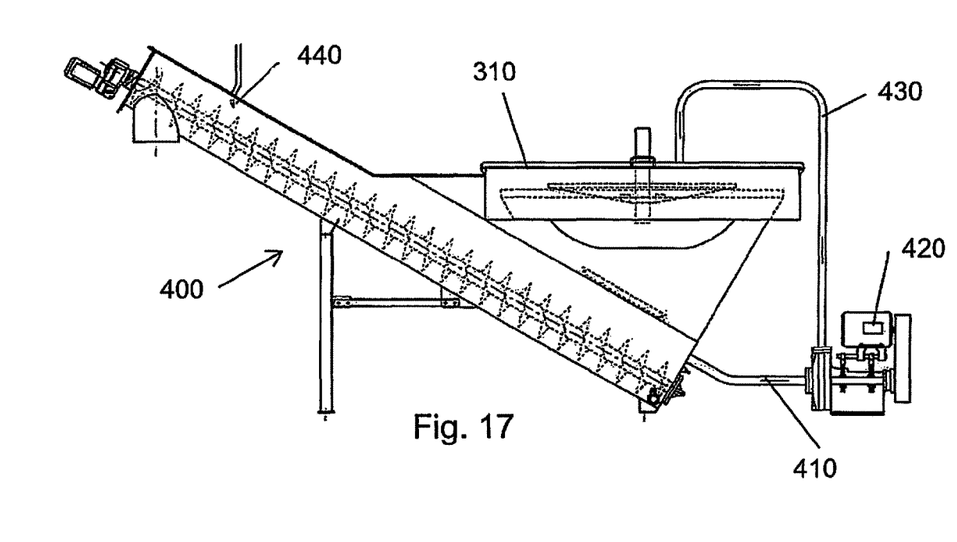
FIG. 17 is a side elevational view of a seventh embodiment of a fine grit classifier according to the present invention.

FIG. 17 is a side elevational view of a seventh embodiment of a fine grit classifier 400 according to the present invention. In this embodiment, MOLS is recycled from the lower portion of the settling tank 22 through a first pipe 410 by a variable speed pump 420 and delivered to the launder tank 310 through a second pipe 430. In the alternative, or in addition, recycled MOLS can be delivered directly to the settling tank rather than to the launder tank 310 (not shown). Preferably, the amount of turbulence induced in the MOLS in the classifier 400 can be varied by adjusting the speed of the pump 420. In addition, a spray head 440 is provided to deliver water to wash or, optionally, an acidic solution to dissolve residual MOLS from the grit being transported by the auger 40 in the upper part of the settling tank 24.

Figure 18:
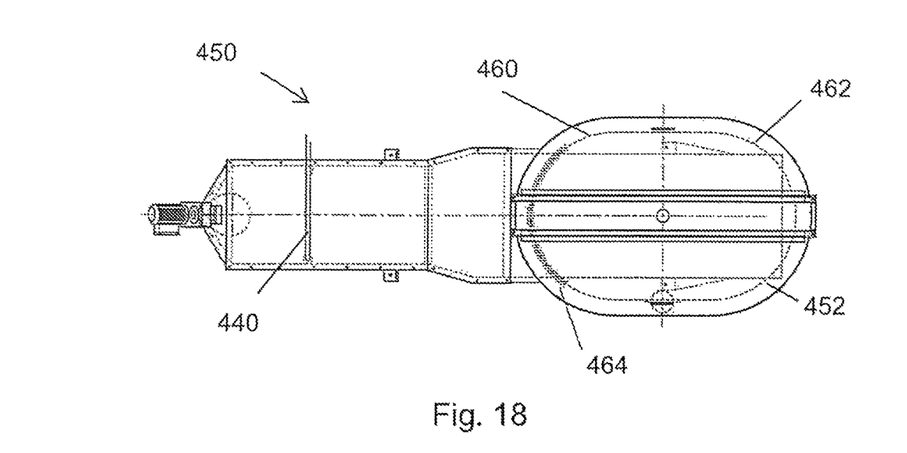
FIG. 18 is a top plan view of an eighth embodiment of a fine grit classifier according to the present invention.

FIG. 18 is a top plan view of an eighth embodiment of a fine grit classifier 450 according to the present invention. In this embodiment, the weir 460 of the launder 452 has two sections 462, 464, with the section 464 of the weir 460 adjacent the rear of the classifier 450 having a lower height, such as from 1/16 inch to 1/2 inch, than the remaining portion 462 of the weir 460 in order to promote drainage from the auger 40.

Figure 19:
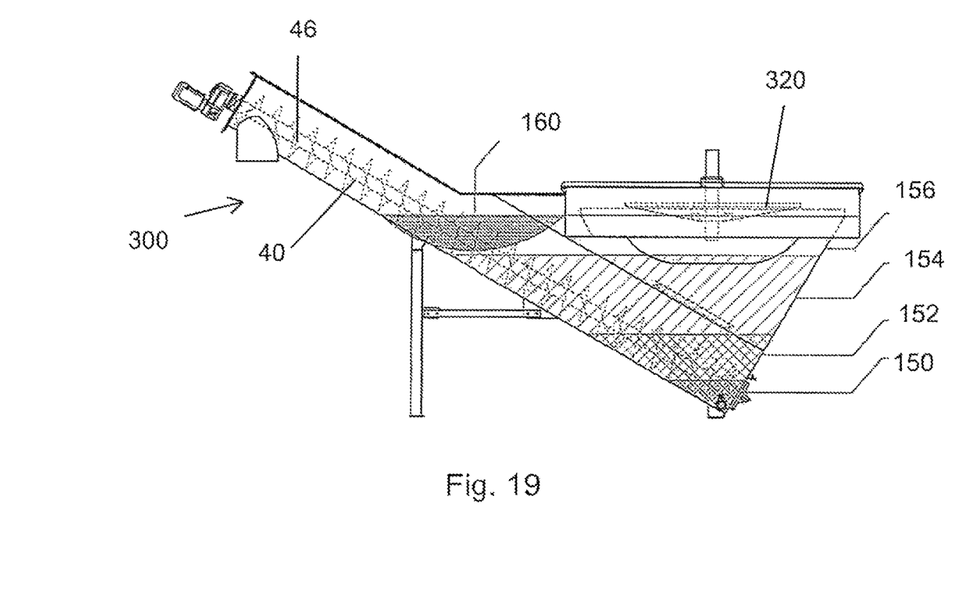
FIG. 19 is a side further elevational view of the fifth embodiment of the fine grit classifier of the present invention showing a "dead zone."

FIG. 19 is a side elevational view of the fifth embodiment 300 of the fine grit classifier according the present invention, identifying the compaction zone 150, the thickening zone 152, the hindered settling zone 154 and the clarified zone 156 of the MOLS in the classifier, as well as a "dead zone" 160 which has been found to occur between the upper end 46 of the auger 40 and the launder 320. Transport of MOLS to the launder 320 appears to be inhibited in the dead zone 160 in prior art classifiers, and the present invention provides improved transport through this zone 160.

Various modifications can be made in the details of the various embodiments of the apparatus and methods of the present invention, all within the scope and spirit of the invention as defined by the appended claims.

The invention claimed is:

1. A fine grit classifier for removing grit from a milk of lime slurry, the fine grit classifier including:
   a settling tank for receiving the milk of lime slurry, the settling tank providing a predetermined water line for the milk of lime slurry, the settling tank having a lower portion below the water line and an upper portion above the water line;
   an inlet for delivering the milk of lime slurry to the settling tank;
   an outlet for discharging clarified milk of lime slurry from the settling tank;
   at least one launder for collecting milk of lime slurry from the upper portion of the settling tank and directing milk of lime slurry to the outlet, the at least one launder including at least one weir;
   at least one auger having a lower end and an upper end for transporting settled grit from the lower portion of the settling tank to the upper portion of the settling tank and discharging the settled grit from the fine grit classifier, and an adjustable sizing baffle limiting the size of grit particles delivered to the outlet of the settling tank, the sizing baffle being provided proximate the weir of the at least one launder.

2. A fine grit classifier according to claim 1 further comprising means for inducing turbulence in the milk of lime slurry in the settling tank.

3. A fine grit classifier according to claim 2, wherein the means for inducing turbulence includes at least one mechanical mixer.

4. A fine grit classifier according to claim 2 wherein the means for inducing turbulence includes at least one turbulence inducer provided in the inlet for delivering the milk of lime slurry to the settling tank.

5. A fine grit classifier according to claim 2 further wherein the means for creating turbulence comprises means for recirculating milk of lime slurry by drawing milk of lime slurry from the lower portion of the tank and delivering the drawn milk of lime slurry to the upper portion of the tank.

6. A fine grit classifier according to claim 2 further comprising at least one baffle provided in the lower portion of the settling tank for shielding the auger from induced turbulence.

7. A fine grit classifier according to claim 2, wherein the means for inducing turbulence includes at least one pump for drawing milk of lime suspension from the settling tank and returning the milk of lime slurry to the settling tank.

8. A fine grit classifier according to claim 1, further comprising means for washing grit in the upper portion of the settling tank.

9. A fine grit classifier according to claim 8 wherein the means for washing grit in the upper portion of the settling tank includes at least one spray head for directing wash water towards the auger.

10. A fine grit classifier according to claim 1 further including a launder tank positioned generally above the settling tank, the launder tank having a greater surface area than the portion of the settling tank below the launder tank, and the launder tank including the at least one launder.

11. A fine grit classifier according to claim 1 wherein the at least one weir includes at least one single weir.

12. A fine grit classifier according to claim 1 wherein the at least one weir includes at least one double weir.

13. A fine grit classifier according to claim 1 wherein the at least one weir includes at least one notched weir.

14. A fine grit classifier according to claim 1 wherein the at least one weir includes at least one weir having a first horizontal extension and at least one weir having a second horizontal extension, the second horizonal extension exceeding the first horizontal extension.

15. A fine grit classifier according to claim 14 wherein the at least one weir having a first horizontal extension is positioned between the upper end of the auger and the at least one weir having a second horizontal extension.

16. A fine grit classifier according to claim 1 wherein the sizing baffle comprises at least one vertically extending baffle positionable into the water line.

17. A fine grit classifier according to claim 1 wherein the auger is greater than nine inches in diameter, and rotatable at a speed from about 2 rpm to 42 rpm.

18. A fine grit classifier according to claim 1 wherein the classifier is adapted to provide fine grit having a moisture content of from about 3 to 30 percent on a weight basis.

* * * * *